United States Patent [19]

Freeman et al.

[11] Patent Number: 5,464,899
[45] Date of Patent: Nov. 7, 1995

[54] HIGH MODULUS LOW HYSTERESIS RUBBER COMPOUND FOR PNEUMATIC TIRES

[75] Inventors: Roy M. Freeman; William L. Hergenrother, both of Akron; Frederick J. Ravagnani, Uniontown, all of Ohio

[73] Assignee: Bridgestone Corporation, Tokyo, Japan

[21] Appl. No.: 220,765

[22] Filed: Mar. 31, 1994

Related U.S. Application Data

[63] Continuation-in-part of Ser. No. 998,301, Dec. 30, 1992, abandoned.

[51] Int. Cl.⁶ ............................ C08L 51/04; C08K 5/098
[52] U.S. Cl. .......................... 524/504; 524/523; 524/526; 524/533; 525/71; 525/78; 525/80
[58] Field of Search .................... 525/78, 71, 80; 524/533, 496, 504, 523, 526

[56] References Cited

U.S. PATENT DOCUMENTS

| | | | |
|---|---|---|---|
| Re. 30,137 | 11/1979 | Messerly ........................... | 152/357 |
| 2,477,754 | 8/1949 | Kraft .................................. | 152/166 |
| 3,280,082 | 10/1966 | Natta et al. . | |
| 3,450,182 | 6/1969 | Verdier .............................. | 152/352 |
| 3,542,108 | 11/1970 | Rye et al. ......................... | 152/360 |
| 3,773,096 | 11/1973 | Masson ............................. | 152/361 |
| 3,873,348 | 3/1975 | Reilly et al. ...................... | 117/72 |
| 3,911,987 | 10/1975 | Takusagawa et al. ............. | 152/354 |
| 3,949,798 | 4/1976 | Gardner et al. ................... | 152/330 |
| 3,954,131 | 5/1976 | Hoshino et al. ................... | 152/354 |
| 3,983,919 | 10/1976 | Messerly ........................... | 152/357 |
| 3,985,173 | 10/1976 | Masson ............................. | 152/361 |
| 4,067,372 | 1/1978 | Masson ............................. | 152/354 |
| 4,067,374 | 1/1978 | Alden et al. ...................... | 152/354 |
| 4,076,255 | 2/1978 | Moore et al. ..................... | 524/533 |
| 4,096,899 | 6/1978 | Kitazawa et al. ................. | 152/354 |
| 4,111,249 | 9/1978 | Markow ............................ | 152/330 |
| 4,202,393 | 5/1980 | Ikeda et al. ....................... | 152/330 |
| 4,203,481 | 5/1980 | Ranik, Jr. .......................... | 152/330 |
| 4,261,405 | 4/1981 | Yamauchi et al. ................ | 152/330 |
| 4,265,288 | 5/1981 | Kaneko et al. .................... | 152/209 |
| 4,287,924 | 9/1981 | Deck et al. ........................ | 152/153 |
| 4,287,929 | 9/1981 | Huinink ............................. | 152/354 |
| 4,365,659 | 12/1982 | Yoshida et al. ................... | 152/354 |
| 4,465,829 | 8/1984 | Graves ............................... | 524/432 |
| 4,495,326 | 1/1984 | Donatelli et al. .................. | 524/533 |
| 4,500,466 | 2/1985 | Hayes et al. ...................... | 524/533 |
| 4,529,770 | 7/1985 | Hayes et al. ...................... | 524/533 |
| 4,779,658 | 10/1988 | Kawabata et al. ................ | 152/517 |
| 4,824,899 | 4/1989 | Yasuda .............................. | 524/533 |
| 4,917,164 | 4/1990 | Ushikubo et al. ................. | 152/517 |
| 4,929,684 | 5/1990 | Roland et al. ..................... | 525/274 |
| 5,008,537 | 2/1992 | Kan et al. .......................... | 152/525 |
| 5,115,021 | 5/1992 | Blythe et al. ...................... | 524/78 |
| 5,131,455 | 7/1992 | Tokieda et al. .................... | 152/517 |
| 5,145,536 | 9/1992 | Noma et al. ....................... | 152/209 |
| 5,151,139 | 9/1992 | Takada .............................. | 152/454 |
| 5,158,627 | 10/1992 | Saneto et al. ...................... | 152/510 |

FOREIGN PATENT DOCUMENTS

| | | |
|---|---|---|
| 0101400A2 | 2/1984 | European Pat. Off. . |
| 0371755A2 | 6/1990 | European Pat. Off. . |
| 0509295A1 | 3/1992 | European Pat. Off. . |
| 0514910A1 | 11/1992 | European Pat. Off. . |
| 55-68406 | 5/1980 | Japan . |
| 2087508 | 6/1982 | United Kingdom . |
| 2138367 | 4/1984 | United Kingdom . |

OTHER PUBLICATIONS

"Fillers: Carbon Black and NonBlack" B. B. Boonstra, *Rubber Technology*, Second Edition, pp. 51–59, Van Nostrand Reinhold Corp. (1973).

"Carbon Black" E. M. Dannenberg, *The Vanderbilt Rubber Handbook*, pp. 408–424, RT Vanderbilt Co., Norwalk, Conn. 06855 (1978).

*Primary Examiner*—Paul R. Michl
*Assistant Examiner*—M. L. Warzel
*Attorney, Agent, or Firm*—Daniel N. Hall

[57] ABSTRACT

A sulfur-vulcanizable rubber compound, being devoid of peroxide components, having high modulus and low hysteresis properties subsequent to vulcanization. Such compounds comprise from about 25 to 55 parts by weight of polyisoprene; and from about 75 to 45 parts by weight of a diene polymer selected from the group consisting of homopolymers of conjugated diene monomers and copolymers thereof with monoolefin monomers and EPDM terpolymers to total 100 parts by weight of rubber polymer; from about 50 to 70 parts by weight of a reinforcing filler, per 100 parts by weight wherein at least a portion of at least one of the rubber polymers is grafted with a polymeric metal salt of an α, β-ethylenically unsaturated carboxylic acid to form an uncured graft rubber copolymer and at least about 4 parts by weight of a curative selected from the group consisting of sulfur and sulfur donors, per 100 parts by weight of rubber. Pneumatic tires and structural components therefor are manufactured from rubber compounds having high modulus, low hysteresis and high compressive flex fatigue and provide run flat operation.

13 Claims, 1 Drawing Sheet

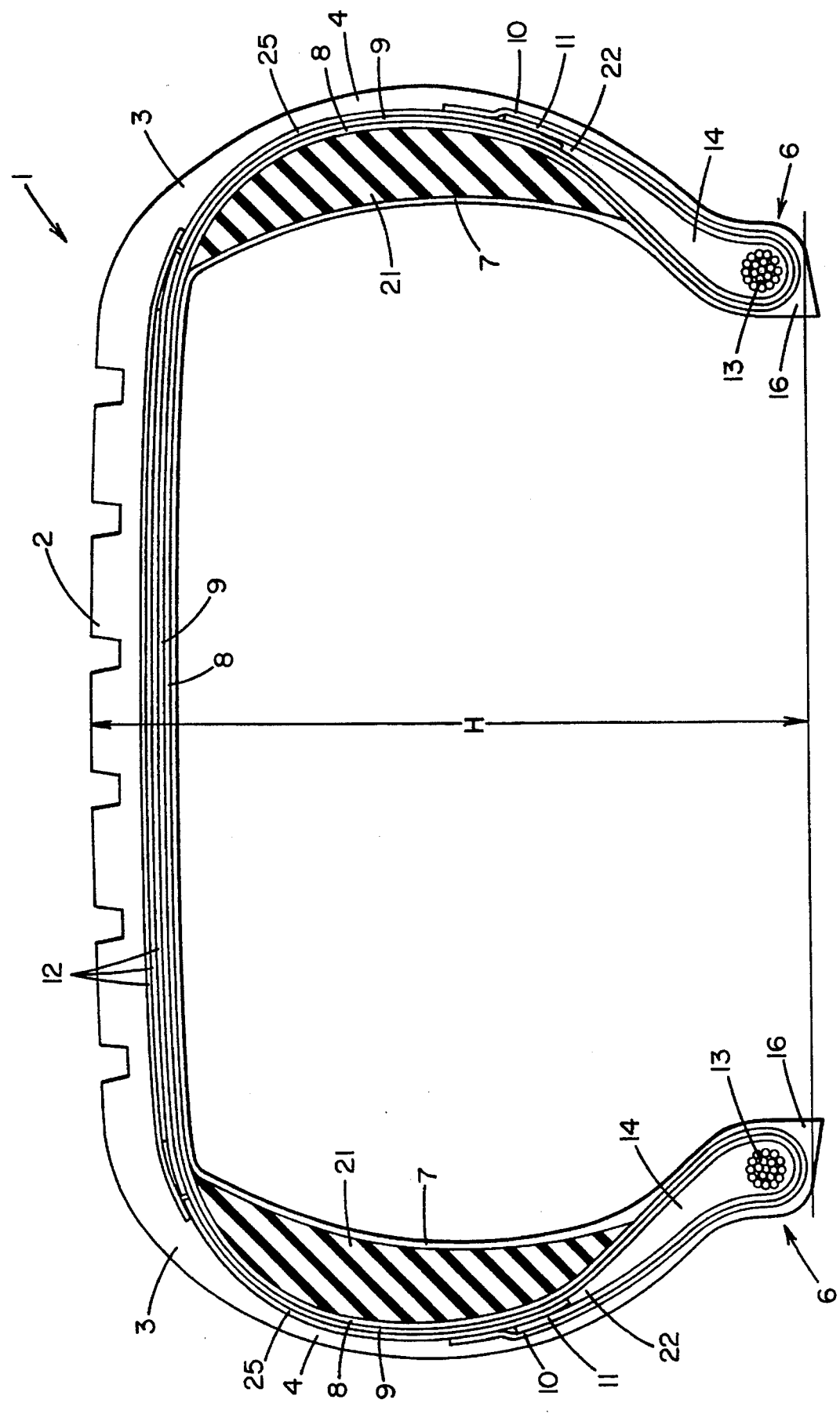

HIGH MODULUS LOW HYSTERESIS RUBBER COMPOUND FOR PNEUMATIC TIRES

CROSS-REFERENCE TO RELATED APPLICATIONS

This application is a continuation-in-part of U.S. patent application Ser. No. 07/998,301, filed Dec. 30, 1992, now abandoned.

TECHNICAL FIELD

This invention relates to novel sulfur-vulcanizable rubber compounds having high modulus and low hysteresis. Such compounds can be utilized in various components of pneumatic tires and particularly in pneumatic safety tires which have a wall stiffness such that when the tire is punctured during running, it can bear the load of the vehicle to allow for continued high speeds for a relatively long distance until the proper repair or tire replacement can be made. More particularly, compounds of the present invention can be employed in components of safety tires having a high profile with a section height of at least 5 inches. One such tire component is a sidewall insert. While the compounds of the present invention may comprise ingredients that are currently commercially available, the particular combination and proportions in which they are used was not previously known.

BACKGROUND OF THE INVENTION

Various tire constructions have been devised over the years which enable a tire to run in an underinflated or non-inflated condition, such as after receiving a puncture and loss of air, for extended periods of time and at relatively high speeds, to enable the vehicle operator to safely drive the vehicle to an appropriate location for repair or replacement of the punctured tire. Certain of these safety tires, referred to as "run flat tires", have been successful for certain applications and embody various types of tire constructions. Many such run flat tires achieve their run flat property by the placement of reinforcing layers or members of relatively stiff elastomeric material in the sidewall areas of the tire where they enable the tire to support the vehicle weight even with the complete loss of internal air pressure.

Examples of various prior art run flat tire constructions are set forth in the following patents:

U.S. Pat. No. 3,911,987 discloses a low profile motorcycle tire which has an elastomeric internal reinforcement that enables the tire to stay inflated for a short duration with little or no air pressure. This reinforcing layer has a Shore A hardness of at least 45, preferably within the range of 60 to 90, and is positioned either outwardly of two tire body carcass plies or between the two carcass plies. This elastic reinforcement is constructed with varying thicknesses, and is cross-sectioned to eliminate abrupt changes of effective hardness of the sidewall and reinforcing layer.

U.S. Pat. No. 3,949,798 discloses another run flat tire construction for a low profile tire having reinforcing rubber insert strips located between the inner strips located between the inner liner and body ply carcass of the tire sidewall.

U.S. Pat. No. 3,954,131 discloses a safety tire which has elastomeric internal reinforcements in the sidewalls which permit the tire to be used for short durations with little or no air pressure within the tire. The elastomeric side reinforcements are of varying thicknesses and are positioned outwardly of the tire carcass.

U.S. Pat. No. 4,067,372 discloses a pneumatic radial tire having internal reinforcements in its sidewalls which are formed of hard rubber and are used in combination with the body carcass plies and tire bead rubber inserts to give additional stiffness to the supple portions of the tire. The body carcass plies are located outwardly of the rubber inserts and are made from several cord fabric radial plies, and extend completely to the bead area of the tire.

U.S. Pat. No. 4,202,393 discloses a low profile motorcycle tire that has sidewall reinforcements to allow for a run flat condition in which the reinforcements are composed of an elastic filler with a reinforcing ply positioned completely around the elastic filler.

U.S. Pat. No. 4,2023,481 discloses a run flat tire construction having reinforcing inserts made from a high modulus, low hysteresis rubber compound, which are located inwardly of the reinforcing carcass plies of the tire.

U.S. Pat. No. 4,261,405 shows another run flat tire construction for a low profile tire having a specially constructed rubber insert mounted between the inner liner and body ply carcass in the sidewall of the tire, in order to achieve the required rigidity for supporting the vehicle in an uninflated condition.

U.S. Pat. No. 4,287,924 discloses another run flat safety tire with sidewall reinforcing members. These members are comprised of two components, one of which is more flexible than the other, having a hardness rating greater than 70 and the other having a hardness rating of between 80 and 95. These reinforcing members are encased in the carcass plies of the tire and have a heat conducting layer positioned between the two components of the supporting members to alleviate heating problems in the thickest portions of the supporting members.

U.S. Pat. No. 4,365,659 discloses a run flat safety tire which has sidewall reinforcements made from low heat build up rubber which are positioned between an inner protective layer and the outer carcass plies of the tire.

U.S. Pat. No. 4,917,164 discloses the use of crescent-shaped reinforcing layers in the sidewalls of the tire to allow the tire to run for short durations with little or no air pressure. The reinforcing layers are of varying thickness and have a Shore A hardness of between 65 and 85, and are positioned between the innerliner and carcass plies of the tire. The wall thickness of the reinforcing members is between 1 and 12 millimeters.

Although many of these run flat tire constructions set forth in the above-referenced patents, have proven to be successful for certain applications, all these constructions pertain to low profile tires, that is a tire having a section height less than 5 inches and are of the type usually found on high performance vehicles (such as racing cars) or motorcycles, and rely almost entirely on the stiffness of the elastomeric insert to provide the support for the uninflated tire. Furthermore, these high performance and motorcycle tires carry relatively smaller loads when compared to the higher weights carried by the larger cars using the higher section height tires.

Heretofore, providing a run flat tire with a high profile tire construction, that is, a run flat tire having a section height of 5 inches or greater, has not proved successful due to the relatively large sidewall reinforcement members which would be required to adequately support the tire in an uninflated condition to enable the tire to run for a relatively long distance at a high rate of speed. The relatively large rubber inserts required would increase the weight of the tire

3 to an unacceptable limit and would materially detract from its ride characteristic. If the amount of or type of material in these relatively large sidewall inserts were reduced or changed in order to lessen the weight of the tire and improve its ride characteristics, excessive heat would be generated within the inserts during a run flat operation, resulting in the rapid destruction of the tire, thus preventing the desired run flat conditions from being achieved at usual highway speeds for satisfactory use on such tires on most passenger vehicles.

Patents have also addressed the addition of metal salts of organic acids to rubbers compositions. U.S. Pat. No. 4,076,255, for instance discloses a golf ball having a central core comprising a cis-polybutadiene elastomer, and a monomer capable of grafting with the elastomer and comprising a metal salt of an unsaturated carboxylic acid and a polyol ester or anhydride of a polybasic unsaturated carboxylic acid.

U.S. Pat. No. 4,824,899 discloses rubber compositions suitable for use in a bead filler of a tire which composition contains a metal salt of an acrylic acid with no mention of the latter being grafted to the rubber which is either natural or a blend with a synthetic diene rubber.

U.S. Pat. No. 4,929,684 discloses a sidewall for pneumatic tires comprising natural rubber, addition polymerized synthetic rubber and blends thereof, with zinc dimethacrylate. No mention of grafting is provided as the metal salt is only employed as a reinforcing filler to increase the static tensile modulus of the rubber stock. Alternative additives for this purpose disclosed by the patent include chopped cellulose and styrene acrylonitrile resin.

Nevertheless, a sulfur-vulcanizable rubber compound having sufficiently high modulus for use in tire components or structural elements so as to allow the resulting tire to have run flat characteristics is not described in the foregoing art. The need has existed for a rubber compound for use in components such as sidewall inserts for high profile pneumatic safety or run flat tires. This need has not been met by known rubber compounds.

SUMMARY OF THE INVENTION

Thus, it is an object of the present invention to provide a sulfur-vulcanizable, peroxide-free rubber compound that possesses high modulus, low hysteresis and Shore A hardness within a specific high range subsequent to vulcanization.

It is another object to provide a sulfur-vulcanizable, peroxide-free rubber compound as above that can be employed to manufacture components or structural elements of pneumatic tires which exhibit run flat characteristics.

It is yet another object of the present invention to provide a sulfur-vulcanizable, peroxide-free rubber compound as above that can be employed to manufacture components of pneumatic tires having a section height of 5 inches or greater.

It is still another object of the present invention to provide a sulfur-vulcanizable, peroxide-free rubber compound that is useful to manufacture structural components of pneumatic tires including sidewall inserts, bead filler structures, high speed insert structures and the like.

It is yet another object of the present invention to provide a sulfur-vulcanizable, peroxide-free rubber compound having properties of high modulus, low hysteresis and sufficient stiffness to be useful in the construction of pneumatic tires and provide the necessary reinforcing effect required to enable the tire to support the vehicle in a run flat condition.

At least one or more of the foregoing objects, together with the advantages thereof over known rubber compounds and the use thereof in pneumatic tires which shall become apparent from the specification which follows, are accomplished by the invention as hereinafter described and claimed.

In general, the present invention pertains to a sulfur-vulcanizable rubber compound, being devoid of peroxide components, having high modulus and low hysteresis properties subsequent to vulcanization comprising from about 25 to 55 parts by weight of polyisoprene; from about 75 to 45 parts by weight of a diene polymer selected from the group consisting of homopolymers of conjugated diene monomers and copolymers thereof with monoolefin monomers and EPDM terpolymers, to total 100 parts by weight of rubber polymer; wherein a portion of at least one of the rubber polymers is grafted with a polymeric metal salt of an $\alpha$, $\beta$-ethylenically unsaturated carboxylic acid to form an uncured graft rubber copolymer; from about 50 to 70 parts by weight of a reinforcing filler, per 100 parts of rubber and at least about 4 parts by weight of sulfur, per 100 parts by weight of rubber.

The present invention also provides a sulfur-vulcanizable rubber compound, being devoid of peroxide components, having high modulus and low hysteresis properties subsequent to vulcanization comprising from about 25 to 55 parts by weight of polyisoprene, from about 75 to 45 parts by weight of a diene polymer selected from the group consisting of homopolymers of conjugated diene monomers and copolymers thereof with monoolefin monomers and EPDM terpolymers, to total 100 parts by weight of rubber polymer, wherein a portion of at least one of the rubber polymers is grafted with a polymeric metal salt of an $\alpha$, $\beta$-ethylenically unsaturated carboxylic acid by a process using an effective amount of azo-bis-isobutyronitrile as a free radical initiator to form an uncured graft rubber copolymer, from about 50 to 70 parts by weight of a reinforcing filler, per 100 parts by weight of rubber and at least about 4 parts by weight of a curative selected from the group consisting of sulfur and sulfur donors, per 100 parts by weight of rubber.

The present invention also provides a component or structural element for a pneumatic tire comprising sulfur-vulcanizable rubber compound, being devoid of peroxide components, and having high modulus and low hysteresis properties subsequent to vulcanization comprising from about 25 to 55 parts by weight of polyisoprene; from about 75 to 45 parts by weight of a diene polymer selected from the group consisting of homopolymers of conjugated diene monomers and copolymers thereof with monoolefin monomers and EPDM terpolymers, to total 100 parts by weight of rubber polymer; wherein a portion of at least one of the rubber polymers is grafted with a polymeric metal salt of an $\alpha$, $\beta$-ethylenically unsaturated carboxylic acid to form an uncured graft rubber copolymer; from about 50 to 70 parts by weight of a reinforcing filler, per 100 parts by weight of rubber and at least about 4 parts by weight of sulfur, per 100 parts by weight of rubber.

Finally, the present invention provides a pneumatic tire having run flat properties imparted to it by at least one structural component comprising a sulfur-vulcanizable rubber compound, being devoid of peroxide components, and having high modulus, low hysteresis and high compressive flex fatigue properties subsequent to vulcanization comprising from about 25 to 55 parts by weight of polyisoprene; from about 75 to 45 parts by weight of a diene polymer selected from the group consisting of homopolymers of conjugated diene monomers and copolymers thereof with monoolefin monomers and EPDM terpolymers, to total 100 parts by weight of rubber polymer; wherein a portion of at least one of the rubber polymers is grafted with a polymeric metal salt of an α, β-ethylenically unsaturated carboxylic acid to form an uncured graft rubber copolymer; from about 50 to 70 parts by weight of a reinforcing filler, per 100 parts by weight of rubber and at least about 4 parts by weight of sulfur, per 100 parts by weight of rubber.

BRIEF DESCRIPTION OF THE DRAWING

The drawing figure provides a cross-sectional view of a high profile tire whose construction is designed for run flat operation according to the invention.

PREFERRED MODE FOR CARRYING OUT THE INVENTION

As noted hereinabove the present invention is directed toward sulfur-vulcanizable rubber compounds, being devoid of peroxide components, having high modulus, low hysteresis and a specific hardness range subsequent to vulcanization which are useful in the manufacture of high aspect ratio pneumatic tires, particularly safety tires possessing run flat characteristics. Physical properties that are necessary for the structural components of a run flat tire and that are possessed by the compounds of the present invention include stiffness, low heat build up and good resistance to heat. Stiffness, which is determined by high modulus and high hardness, is necessary to minimize sidewall displacement in run flat, or underinflated, conditions. Low heat build up is attributed to low hysteresis properties resulting in compounds which are cooler running and impart increased tire life under run flat operating conditions. Finally, good heat resistance is also necessary to increase the life of the tire operating under run flat conditions. For good heat resistance it is necessary that the compound possess good aging and reversion resistance properties.

Rubber compounds, according to the present invention, comprise natural or synthetic polyisoprene, with natural polyisoprene being preferred, and elastomeric diene polymers including polybutadiene and copolymers of conjugated diene monomers with at least one monoolefin monomer. The rubber compounds provide the required low hysteresis and low heat build up properties, the polybutadiene rubber providing low hysteresis and low compression set, and the polyisoprene providing low hysteresis and high tensile strength. Suitable polybutadiene rubber is elastomeric and has a 1,2-vinyl content of about 1 to 3 percent and a cis-1,4 content of about 96 to 98 percent. Other high vinyl butadiene rubbers, having up to about 12 percent 1,2-content, may also be suitable with appropriate adjustments in the level of other components, and thus, substantially any high vinyl, elastomeric polybutadiene can be employed. The copolymers may be derived from conjugated dienes such as 1,3-butadiene, 2-methyl-1,3-butadiene-(isoprene), 2,3-dimethyl-1,2 -butadiene, 1,3-pentadiene, 1,3-hexadiene and the like, as well as mixtures of the foregoing dienes. The preferred conjugated dienes is 1,3-butadiene. Regarding the monoolefinic monomers, there include vinyl aromatic monomers such as styrene, alpha-methyl styrene, vinyl naphthalene, vinyl pyridine and the like as well as mixtures of the foregoing monoolefins. The copolymers may contain up to 50 percent by weight of the monoolefin based upon total weight of copolymer. The preferred copolymer is a copolymer of a conjugated diene, especially butadiene, and a vinyl aromatic hydrocarbon, especially styrene. Preferably the diene polymer content of the rubber compound can comprise up to about 25 percent by weight of styrene-butadiene random copolymer, preferably 7 to 10 percent by weight.

The above-described copolymers of conjugated dienes and their method of preparation are well known in the rubber and polymer arcs. Many of the polymers and copolymers are commercially available. It is to be understood that practice of the present invention is not to be limited to any particular rubber included hereinabove or excluded.

An EPDM terpolymer rubber can also be utilized to form the backbone portion of the graft copolymer of the invention. The term "EPDM" is used in the sense of its definition as found in ASTM-D-1418-64 and is intended to mean a terpolymer of ethylene, propylene and a diene monomer. Illustrative methods for preparing such terpolymers are found in U.S. Pat. No. 3,280,082 and British Pat. No. 1,030,289, the disclosures of which are incorporated herein by reference. The preferred terpolymers contain from about 40 to about 80 weight percent ethylene and from about 1 to about 10 weight percent of the diene with the balance of the terpolymer being propylene.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl- 1,5-hexadiene, cyclooctadiene, 1,4-octadiene, 1,7-octadiene, 5-ethylidene-2-norbornene, 5-N-propylidene-2-norbornene, 5-(2-methyl-2-butenyl)-2-norbornene and the like. A typical EPDM is Vistalon 2504 (Exxon Chemical Co.), a terpolymer having a Mooney Viscosity (ML, 1+8, 100° C.) of about 40 and having 50 weight percent of ethylene, 45 weight percent of propylene and 5.0 weight percent of 5-ethylidene-2-norbornene with an $\overline{M}_n$ as measured by GPC of about 47,000 and an $\overline{M}_n$ as measured by GPC of about 174,000.

A preferred EPDM is Royalene® 521 (Uniroyal Chemical Co.), a terpolymer having a Mooney Viscosity (ML/4/100° C.) of about 50 and having 50 weight percent of ethylene, 43 weight percent of propylene and 6.6 weight percent of ethylidene norbornene.

The high modulus and high hardness properties can be attained by using monomers derived from certain polymerizable metal salts of α, β-ethylenically unsaturated carboxylic acids. These monomers have the formula

$$(RCO_2)_xM$$

where R is an α, β-ethylenically unsaturated acyclic moiety having 2 to about 7 carbon atoms such as acrylic, methacrylic, cinnamic and crotonic acids of which acrylic and methacrylic acids are preferred; M is a metal ion selected from the group consisting of sodium, potassium, magnesium, calcium, zinc, barium, aluminum, tin, zirconium, lithium and cadmium of which zinc and magnesium are preferred; and x is an integer corresponding to the valence of M. A particularly preferred monomer for this use is zinc dimethacrylate, which may alternatively be referred to as a metal salt.

In the present invention, zinc dimethacrylate or other metal salt of an α, β-ethylenically unsaturated carboxylic acid, is combined with at least one of the rubber polymers disclosed hereinabove in a grafting reaction such that the polymer of the metal salt is grafted onto the polymeric backbone. More specifically, poly zinc dimethacrylate is preferably grafted to the rubber polymers by a free radical graft copolymerization, as discussed hereinbelow. Unlike the existing state of the art which has provided for the addition of such metal salts to the rubber compound as a filler or pigment, the present invention calls for the preparation of a polymer derived from the metal salt of an α, β-ethylenically unsaturated carboxylic acid, which is grafted from at least one of the rubber polymers.

The graft copolymer can be prepared by a relatively uncomplicated procedure. Thus, the graft copolymer can be prepared by first dissolving an unsaturated hydrocarbon rubber of the type described above such as polybutadiene in a solvent such as hexane, then adding the monomeric metal salt of an unsaturated carboxylic acid such as zinc dimethacrylate to the polymer solution, adding a free radical initiator such as azo-bis-isobutyronitrile to the polymer solution and then heating the reaction mixture at a temperature of from about 40° to about 150° C. for a time period of from about 0.1 to about 100 hours to form the graft copolymer which, by the nature of the preparation is freely processable and uncured.

Hydrocarbon solvents which may be employed in the preparation of the graft copolymers include aromatic and aliphatic hydrocarbons in which the rubber polymers are soluble. Suitable hydrocarbon solvents include hexane, heptane, pentane, octane, cyclohexane, cyclohexane, cyclopentane, methyl cyclohexane, benzene and toluene. The preferred hydrocarbon solvents are hexane and toluene.

The monomeric metal salt (e. g., zinc dimethacrylate) is preferably added to the resultant rubber polymer solution contained in a suitable reactor in the form of a fine powder with stirring and under a nitrogen atmosphere to form a dispersion of the metal salt in the rubber polymer solution. While not essential, it is often desirable and preferred to add a surfactant along with the metal salt to the polymer solution in order to provide for a more stable dispersion of the metal salt in the polymer solution. The preferred surfactants for that purpose are nonionic octylphenoxy polyethoxy ethanol surfactants available from Rohm and Haas Company under the designations Triton X-15, Triton X-45 and Triton X-100.

As indicated, a free radical initiator is then added to the rubber polymer solution containing the metal salt to effect graft polymerization of the metal salt to the polymer backbone. It is generally preferred to seal the reactor containing the polymer solution and dispersed metal salt prior to adding the initiator and then to add the initiator in liquid form under pressure to the reactor. Suitable free radical initiators which may be added to the rubber polymer solution for that purpose include di-sec-butyl peroxydicarbonate; t-amyl peroxy pivalate; 2,5-dimethyl- 2,5-di-(2-ethylhexanoyl-peroxy) hexane; t-amyl peroxy-2-ethylhexanoate; t-butyl-2-ethylhexanoate; 2,2-azo-bis-(2-methylpropionitrile) and other hydrocarbon solutions.

After addition of the free radical initiator is completed, the reaction mixture is heated at a temperature of from about 40° to about 150° C. for a time period of from about 0.1 to about 100 hours to produce the graft copolymer.

The graft copolymers can be recovered from the reaction medium by various conventional methods such as alcohol coagulation, steam desolventization, thermal desolventization and the like. Additionally, solvent may be removed from the graft copolymer by drum drying, extruder drying, vacuum drying and the like.

It is not possible to practice the present invention by adding to the rubber polymer(s) zinc metal, or other metal, and an α,β-ethylenically unsaturated carboxylic acid. Instead, the metal salt of the acid must be added to a solution of the rubber as previously described, forming a poly zinc dimethacrylate or other polymeric graft with the rubber polymer. Moreover, the resulting graft copolymer rubber must be uncured which is important to the utility of the rubber. In the manufacture of a tire or other vulcanizable rubber article, for instance, the graft rubber forming the particular tire component must remain uncured in order to allow mixing of the other components and also to ensure good and complete adhesion to the surrounding components which are vulcanized together to form the tire or other rubber article.

Zinc dimethacrylate, when added to certain rubber compounds as a pigment, has been know to impart high modulus and high hardness properties. However, when the metal salt is added to the rubber polymers in the grafting reaction, superior properties such as flex fatigue are also imparted to the rubber compound as compared to those compounds wherein the zinc dimethacrylate has merely been added as a pigment. Improved compressive flex fatigue is determined according to ASTM Testing Procedure D-623. As described in U.S. Pat. No. 4,465,829, owned by the Assignee of record, the subject matter of which is incorporated herein by reference, a blow-out time ranging from about 95 to about 150 minutes is measured by this ASTM Test and relates to flex fatigue. For purposes of the present invention, a blow-out time exceeding 180 minutes (3 hours) is deemed to be satisfactory for use as a component of a run-flat tire.

The rubber compounds of the present invention comprise from about 25 to 55 parts by weight of polyisoprene, and from about 45 to 75 parts by weight of a diene polymer selected from the group consisting of homopolymers of conjugated diene monomers and copolymers thereof with monoolefin monomers and EPDM terpolymers, to total 100 parts by weight of rubber (phr). A portion of at least one of these rubber polymers is present as the grafted polymer. In other words, the total rubber compound includes a portion of polyisoprene and polybutadiene or diene copolymer which is not grafted and a portion which has become part of the grafted polymer. The grafted portion may be taken from either rubber polymer portion or from a portion of both.

The grafted rubber copolymer, according to the present invention is uncured and comprises about 60 to 80 weight percent base (that is, substrate) polymer and about 40 to 20 weight percent of the zinc dimethacrylate polymer or polymer of another monomer derived from a related metal and/or a related α,β-ethylenically unsaturated carboxylic acid.

Additionally, the compounds of the present invention comprise from about 50 to 70 phr of carbon black as a low hysteresis filler material. Particularly useful is FEF (fast extrusion furnace) black, a relatively high structure and large particle size carbon black namely, 40 mm, 40 m²/g, particle size and surface area, respectively. Further discussions of such carbon blacks can be found in the literature. See, for example, *The Vanderbilt Rubber Handbook,* pp 408–424, R. T. Vanderbilt Co., Norwalk, Conn. 06855 (1979) and *Rubber Technology,* 2d ed., pp 51–59, Van Nostrand Reinhold Corporation (1973).

The inventive compounds are cured by sulfur, rather than peroxides and thus, a sulfur curing agent, such as sulfur or a sulfur donor is required. Minimally, at least about 4 phr of sulfur, or an equivalent amount of donor, is added to the compound to provide high modulus. In the present invention, addition of a sulfur in oil blend is generally preferred, with the mixture comprising about 80 percent by weight of sulfur and 20 percent by weight of oil. The oils employed are conventional rubber processing oils. Conventional cure accelerators are also employed to provide fast modulus generation during cure. The inventive compounds also include from about 1 to 3 phr of an antioxidant and an antiozonant of conventional types, (employed in the usual amounts) to impart good heat resistance to the compound.

As will be appreciated by those skilled in the art, because the compounds are cured by sulfur, they do not contain any peroxide curatives or other peroxide components. If one of the latter were present in the rubber formulation, the higher temperatures encountered during mixing and compounding would likely be sufficient to cure the rubbers, rendering a mass unsuitable for the manufacture of the desired rubber component which is ultimately subjected to a separate heat-initiated vulcanization to activate the sulfur or other sulfur donor present in the formulation.

Regarding physical properties of the rubber compounds of the present invention, a normalized, mechanical static modulus of from about 1400 psi to 4000 psi is suitable, the preferred range being between about 2600 psi and 2800 psi, with approximately 2700 psi being most preferred. These moduli are at the run flat operating condition (0 psi inflation) and are measured at 15% strain. The hardness range should be within from about 72 and 97 on the Shore A hardness scale, at 23° C., the preferred range being between about 72 and 90, with 88 being most preferred. Likewise, the hysteresis when measured at 100° C. at 10 Hertz and 7 percent deflection, has a tan Delta ($\delta$) of from about 0.0:3 to about 0.20, with the preferred range falling between 0.03; and 0.11 and most preferably, between 0.03; and 0.08.

As an example of a high modulus, low hysteresis, hard sulfur-vulcanizable, peroxide-free rubber compound according to the present invention a rubber blend formulation has been provided in Table I, as Compound 1. The zinc dimethacrylate grafted polybucadiene is designated as $Zn(Ma)_2PBd$ in Table I. All non-rubber parts are presented on the basis of parts by weight per hundred rubber by weight (phr). To the right of Compound 1, Table I lists a range of suitable amounts for each component. Notably, the ranges listed for polyisoprene and polybutadiene includes the polyisoprene and polybutadiene rubber employed by itself and as part of the grafted polymer. Thus, no range is shown for the zinc methacrylate polymer per se.

The compounds of the present invention can contain conventional antioxidants, antiozonants and accelerators, as is shown for Compound 1. It is to be understood that such components are well known to those skilled in the art and thus, the present invention is not limited to the use of any particular antioxidants, antiozonants or accelerators, or amounts thereof. Similarly, practice of the present invention is also not limited to the specific formulation of Compound 1.

TABLE I

HIGH MODULUS, LOW HYSTERESIS,
HARD SULFUR-VULCANIZABLE,
PEROXIDE-FREE RUBBER COMPOUNDS

|  | COMPOUND 1 | RANGES |
|---|---|---|
| Natural rubber | 25.0 | 25–55 |
| Zn(Ma)₂PBd | 52.0* | |
|  |  | 45–75 |
| Polybutadiene (ungrafted) | 40.0 |  |
| FEF carbon black | 57.0 | 50–60 |
| Zinc oxide | 5.7 | 4–6 |
| Stearic acid | 1.14 | 1–2 |
| Naphthenic oil | 0.56 | 0.5–4 |
| Antioxidant[a] | 2.27 | 1–3 |
| Antiozonant[b] | 1.14 | 1–2 |
| Sulfur/oil (80/20) | 8.52 | 6–9 |

TABLE I-continued

HIGH MODULUS, LOW HYSTERESIS,
HARD SULFUR-VULCANIZABLE,
PEROXIDE-FREE RUBBER COMPOUNDS

|  | COMPOUND 1 | RANGES |
|---|---|---|
| Accelerator[c] | 1.70 | 1–2 |
| Accelerator[d] | 0.56 | 0–1 |
| Accelerator[e] | 0.56 | 0–1 |

*contains 35 phr polybutadiene and 17 phr zinc methacrylate
[a] 1,2-dihydro-2,2,4-trimethylquinoline (TMQ)
[b] N-octyl, N'-phenyl-p-phenylene diamine
[c] 2-(morpholinothio)benzothiazolesulfenamide (MBS)
[d] tetramethylthiuram monosulfide (TMTM)
[e] benzothiazyl disulfide (MBTS)

Compound 1 was subjected to cure at 170° C. for 15 minutes following which physical properties were measured and are reported in Table II.

TABLE II

PHYSICAL PROPERTIES OF COMPOUND 1

| Modulus (unaged) |  |
|---|---|
| tensile (psi) | 2330 |
| % elongation (at break) | 167 |
| Modulus (aged) 2 days @ 100° C. |  |
| tensile (psi) | 2130 |
| % elongation (at break) | 122 |
| Modulus (low extension) (psi) (non normalized) |  |
| 5% | 93.0 |
| 10% | 172.0 |
| 20% | 289.0 |
| Durometer Shore A |  |
| 23° C. | 81 |
| 66° C. | 79 |
| MTS tan δ |  |
| (23° C., 10 Hz, 7% def) | 0.135 |
| (66° C., 10 Hz, 7% def) | 0.091 |
| (100° C., 10 Hz, 7% def) | 0.074 |
| (150° C., 10 Hz, 7% def) | 0.069 |
| Pendulum rebound |  |
| 23° C. | 56 |
| 100° C. | 72 |
| Dynamic modulus |  |
| 150° C. 10 Hz | 2350 psi |

From the results reported in Table II, it is apparent that the rubber compound of the present invention provided high modulus, low hysteresis and a relatively high Shore A hardness.

As further examples of high modulus, low hysteresis, hard sulfur-vulcanizable, peroxide-free rubber compounds according to the present invention, additional rubber blend formulations have been provided in Table III, as Compounds 2–7. The zinc dimethacrylate polymer was grafted onto the polybutadiene (Compounds 2–5 and 7); the polyisoprene (Compound 3); the EPDM (Compound 5); and the SBR (Compound 7). Additionally, a Control Compound is presented which contained zinc dimethacrylate (ZDMA) but only as a filler, not as a polymer grafted to any of the rubber. All non-rubber parts are presented on the basis of parts by weight per hundred rubber by weight (phr). Unlike Table I, Table III also lists the actual parts of rubber in each recipe.

The compounds of the present invention can contain conventional antioxidants, antiozonants and accelerators, as are presented in Table III. Again, it is to be understood that such components are well known to those skilled in the art and thus, the present invention is not limited to the use of any particular antioxidants, antiozonants or accelerators, or amounts thereof. Accordingly, practice of the present invention is also not limited to the specific formulations of Compounds 2–7.

were measured and are reported in Table IV.

TABLE III

HIGH MODULUS, LOW HYSTERESIS, HARD SULFUR-VULCANIZABLE, PEROXIDE-FREE RUBBER COMPOUNDS

| Compounds | Control | 2 | 3 | 4 | 5 | 6 | 7 |
|---|---|---|---|---|---|---|---|
| Natural Rubber | 25 | 25 | 25 | 25 | 25 | 25 | 25 |
| Polybutadiene | 75 | 40 | 25 | 30 | — | 40 | 40 |
| EPDM | — | — | — | — | 25 | — | — |
| PBD-g-33% ZDMA | — | 35 | 25 | 45 | 25 | — | 35 |
| PI-g-20% ZDMA | — | — | 25 | — | — | — | — |
| EPDM-g-33% ZDMA | — | — | — | — | 25 | — | — |
| SBR(10/90)-G-33% ZDMA | — | — | — | — | — | 35 | — |
| actual parts of rubber in the recipe | 100 | 88 | 87 | 95 | 87 | 88 | 88 |
| FEF C/B | 50 | 50 | 50 | 50 | 50 | 50 | 50 |
| ZDMA | 18 | — | — | — | — | — | — |
| ZnO | 5 | 5 | 5 | 5 | 5 | 5 | 5 |
| Stearic Acid | 1 | 1 | 1 | 1 | 1 | 1 | 1 |
| Zn stearate | — | — | 3 | 3 | 3 | — | — |
| Resin[a] | — | — | — | — | 1 | — | — |
| Naphthenic Oil | 0.5 | 0.5 | 0.5 | 0.5 | — | 0.5 | 0.5 |
| Antioxidant[b] | 1 | 1 | 1 | 1 | 1 | 1 | 1 |
| Antioxidant[c] | 2 | 2 | 2 | 2 | 1 | 2 | 2 |
| Sulfur/Oil (4/1) | 7.5 | 7.5 | 7.5 | 7.5 | 5 | 7.5 | 7.5 |
| Accelerator[d] | 1.5 | 1.5 | 1.5 | 1.5 | 1.5 | 1.5 | 1.5 |
| Accelerator[e] | 0.5 | 0.5 | 0.5 | 0.5 | — | 0.5 | 0.5 |
| Accelerator[f] | 0.5 | 0.5 | 0.5 | 0.5 | — | 0.5 | 0.5 |

[a] resorcinol formaldehyde resin
[b] 1,2-dihydro-2,2,4-trimethylquinoline (TMQ)
[c] N-octyl, N'-phenyl-p-phenylene diamine
[d] 2-(morpholinothio)benzothiazolesulfenamide (MBS)
[e] tetramethylthiuram monosulfide (TMTM)
[f] benzothiazyl disulfide (MBTS)

Compounds 2–7 and the Control were subjected to cure at 170° C. for 15 minutes following which physical properties

TABLE IV

PHYSICAL PROPERTIES OF COMPOUNDS 2–7

|  | Control | 2 | 3 | 4 | 5 | 6 | 7 |
|---|---|---|---|---|---|---|---|
| Cured @ 170° C. for 15 minutes | | | | | | | |
| Tensile psi | 1615 | 2330 | 1890 | 1790 | 1870 | 1860 | 1590 |
| Tensile aged 2 d @ 100° C., psi | 1756 | 2130 | 1480 | 1350 | — | — | — |
| Elong, % | 117 | 167 | 111 | 98 | 108 | 140 | 204 |
| Elong aged 2 d @ 100° C., % | 102 | 122 | 69 | 60 | — | — | — |
| 5% Mod, psi | 132 | 93 | 113 | 116 | — | 120 | 82 |
| 10% Mod, psi | 230 | 172 | 197 | 205 | 385 | 212 | 135 |
| 20% Mod, psi | 389 | 289 | 340 | 355 | 586 | 364 | 218 |
| Shore A @ 23° C. | 85 | 81 | 84 | 85 | 88 | 80 | 76 |
| Shore A @ 100° C. | 83 | 79 | 83 | 84 | 81 | 79 | 73 |
| Tan Delta, 10 Hz, 7% def. @ | | | | | | | |
| 23° C. | 0.109 | 0.135 | 0.094 | 0.097 | 0.091 | — | — |
| 66° C. | 0.085 | 0.091 | 0.053 | 0.063 | — | — | — |
| 100° C. | 0.081 | 0.074 | 0.041 | 0.051 | — | — | — |
| 150° C. | 0.079 | 0.069 | — | — | 0.105 | — | — |
| Rebound @ 23° C. | 61 | 56 | 61 | 60 | 50 | 70 | 61 |
| Rebound @ 100° C. | 72 | 72 | 77 | 70 | 53 | 79 | 74 |
| Dynamic Mod @ 150° C., psi | 2700 | 2350 | — | — | — | — | — |
| Firestone Flex Blow Out @ 55 lbs[a] | | | | | | | |
| Time to Blow Out | 64 min | 3 hrs NF | 3 hrs NF | 3 hrs NF | — | — | — |
| Temp @ End of test, °C. | >245° | 202° | 179° | 185° | — | — | — |
| Block Cond. | disintegrated | solid | solid | solid | — | — | — |

TABLE IV-continued

| | PHYSICAL PROPERTIES OF COMPOUNDS 2–7 | | | | | | |
|---|---|---|---|---|---|---|---|
| | Control | 2 | 3 | 4 | 5 | 6 | 7 |
| Tire Testing | | | | | | | |
| Run Flat Miles | | | | | 35 | — | 70 |
| Rolling Loss, Lbs. | | | | | 11.07 | — | 11.37 | a)ASTM Testing Procedure D-623

The section designated Tire Testing in Table IV was conducted utilizing Compounds 5–7. Experimental tires constructed with Compounds 5 and 7 were successful in run-flat condition to the extent reported in Table IV. Experimental tires constructed with Compound 6 were builtin which the aspect ratio was varied from 60 to 55 to 50 in a solid tread tire, i.e., not tread pattern. This construction provided very low mileage, as expected, although the run flat miles increased by 30 and 64 percent in going to aspect ratios of 55 and 50, respectively, from the base aspect ratio of 60. Actual mileage and rolling loss was not reported and was not conducted for the other rubber Compounds.

As noted hereinabove, the rubber compounds of the present invention can be employed to manufacture components of pneumatic tires. With reference to the drawing figure, a tire cross-section has been presented, depicting typical components of a high profile pneumatic tire. The tire referred to generally by the numeral 1, includes a tread portion 2 terminating in a pair of tread shoulders 3 adjacent a pair of sidewalls 4, which extend radially from the axial outer shoulders 3 to a pair of bead portions indicated generally at 6. As in a typical pneumatic tire, the interior of the tire includes an innerliner 7 formed of a high air impervious material, in combination with a pair of body plies 8 and 9 which form the carcass of the tire. Body plies 8 and 9 extend around bead portion 6 and terminate in turn-up ends 10 and 11 respectively. Each bead portion 6 consists of a usual annular bead wire 13 and a bead filler of generally triangular-shaped cross-section 14. Abrasive gum strips 16 preferably are molded with the finished tire and are adapted to be located adjacent each flange of a wheel rim on which the tire is to be mounted.

Usual reinforcing belts of wire and/or fabric 12 are located between body carcass plies 8 and 9 and tread portion 2. These tire components are all contained within integrally formed inner and outer rubber casings which form the sidewalls of the tire. The tire section height is indicated at "H", and in accordance with the objects of the present invention, a height of at least 5 inches or greater is contemplated; such tires are referred to herein as high profile tires. In passenger tire nomenclature, such as P 225/60 R 16, the number 225 represents the section width of the tire in millimeters; 16 represents the tire diameter in inches, and 60 represents the ratio in percentage of the tire section height with respect to the section width, i.e., the aspect ratio. Thus far, the above-referenced tire construction is illustrative of a general pneumatic tire construction which can vary.

Additionally the tire depicted in the drawing includes several new components which assist in providing a high profile, pneumatic safety tire. One of these is the sidewall insert which comprises a pair of generally crescent-shaped elastomeric reinforcing members indicated at 21 which are mounted between innerliner 7 and body plies 8 and 9 and extend from adjacent tread shoulders 3 of tread portion 2 along the sidewall of the tire to a position generally adjacent the apex 22 of bead filler 14. Another component comprises a pair of biased reinforcing strips or plies 25, which are located between sidewalls 4 and body carcass plies 8 and 9, and elastomeric reinforcing members 21, the latter extending along the sidewall of the tire to a position below apex 22 of bead filler 14. For a more detailed description of such a tire construction, particularly designed for run flat operation as a safety tire, see co-pending application, U.S. Pat. No. 5,217,549 owned by the Assignee of record herein, the subject matter of which is incorporated by reference.

The sulfur-vulcanizable, peroxide-free rubber compounds of the present invention have particular applicability to the formation of the sidewall inserts 21. Additionally, they can be employed in the formation of the bead filler 14. Of course, use of the compounds of the present invention is not limited solely to the manufacture of components for pneumatic tires, but these can be utilized wherever a sulfur-vulcanizable rubber compound having high modulus, low hysteresis and relatively high Shore A hardness properties subsequent to vulcanization is desired, as will be apparent to those skilled in the art.

in conclusion, it should be clear from the foregoing example and specification disclosure that the compounds of the present invention have improved physical properties which can, in turn, improve the run flat performance of pneumatic tires when they are used to make components incorporated therein. It is to be understood that practice of the present invention is not limited to the natural rubber formulation of Compound 1 exemplified herein or by the disclosure of typical rubber polymers provided herein, and that the example has been provided merely to demonstrate practice of the subject invention. Those skilled in the art may readily select and formulate other high modulus, low hysteresis sulfur-vulcanizable rubber compounds according to the disclosure made hereinabove.

Moreover, as noted hereinabove, the present invention should not be limited to the use of such rubber compounds as sidewall inserts for pneumatic tires or even to components of pneumatic tires per se. Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. A sulfur-vulcanizable rubber compound, capable of being worked prior to vulcanization, having high modulus and low hysteresis properties subsequent to vulcanization comprising:

100 parts by weight of an uncured grafted rubber copolymer containing.

from about 25 to 55 parts by weight of polyisoprene, from about 75 to 45 parts by weight of a diene polymer selected from the group consisting of homopolymers of conjugated diene monomers and copolymers thereof with monoolefin monomers and EPDM terpolymers, to total 100 parts by weight of said grafted rubber copolymer, wherein a portion of at least one of said polyisoprene and said diene polymers is grafted with a polymeric metal salt of an α, β-ethylenically unsaturated carboxylic acid to form said uncured grafted rubber copolymer;

about 50 to 70 parts by weight of a reinforcing filler, per 100 parts by weight of said grafted rubber copolymer; and at least about 4 parts by weight of a curative selected from the group consisting of sulfur and sulfur donors, per 100 parts by weight of said grafted rubber copolymer;

wherein the sulfur-vulcanizable rubber compound is devoid of peroxide components, and wherein the sulfur-vulcanizable rubber compound, upon vulcanization, has a tan δ of from about 0.03 to 0.18, measured at 100° C., 7% deflection and 10 Hz.

2. A sulfur-vulcanizable rubber compound, as set forth in claim 1, having a mechanical static modulus in the range of from about 1400 to 4000 psi at 15% strain subsequent to vulcanization.

3. An sulfur-vulcanizable rubber compound, as set forth in claim 1, having a Shore A hardness of from about 72 to 97 subsequent to vulcanization.

4. A sulfur-vulcanizable rubber compound, as set forth in claim 1, wherein said uncured grafted rubber copolymer comprises:

from about 60 to 80 percent by weight of at least one of said polyisoprene and said diene polymer, and from about 20 to 40 percent by weight of said polymeric metal salt of said α, β-ethylenically unsaturated carboxylic acid.

5. A sulfur-vulcanizable rubber compound, as set forth in claim 4, wherein said polymeric metal salt of said α, β-ethylenically unsaturated carboxylic acid is poly zinc dimethacrylate.

6. A sulfur-vulcanizable rubber compound, as set forth in claim 1, wherein said reinforcing filler comprises carbon black.

7. A sulfur-vulcanizable rubber compound, capable of being worked prior to vulcanization, having high modulus and low hysteresis properties subsequent to vulcanization comprising:

100 parts by weight of an uncured grafted rubber copolymer containing, from about 25 to 55 parts by weight of polyisoprene, from about 75 to 45 parts by weight of a diene polymer selected from the group consisting of homopolymers of conjugated diene monomers and copolymers thereof with monoolefin monomers and EPDM terpolymers, to total 100 parts by weight of said grafted rubber copolymer, wherein a portion of at least one of said polyisoprene and said diene polymer is grafted with a polymeric metal salt of an α, β-ethylenically unsaturated carboxylic acid by a process using an effective amount of azo-bis-isobutyronitrile as a free radical initiator to form said uncured grafted rubber copolymer;

about 50 to 70 parts by weight of a reinforcing filler, per 100 parts by weight of said grafted rubber copolymer; and at least about 4 parts by weight of a curative selected from the group consisting of sulfur and sulfur donors, per 100 parts by weight of said grafted rubber copolymer;

wherein the sulfur-vulcanizable rubber compound is devoid of peroxide components, and wherein the sulfur-vulcanizable rubber compound, upon vulcanization, has a tan δ of from about 0.03 to 0.18, measured at 100° C., 7% deflection and 10 Hz.

8. A vulcanized rubber compound having high modulus and low hysteresis properties, made by the process of:

forming an uncured, rubber compound comprising:

100 parts by weight uncured grafted rubber copolymer containing, from about 25 to 55 parts by weight of polyisoprene, from about 75 to 45 parts by weight of a diene polymer selected from the group consisting of homopolymers of conjugated diene monomers and copolymers thereof with monoolefin monomers and EPDM terpolymers, to total 100 parts by weight of said grafted rubber copolymer, wherein a portion of at least one of said rubber polyisoprene and said diene polymer is grafted with a polymeric metal salt of an α, β-ethylenically unsaturated carboxylic acid to form said uncured graft rubber copolymer, about 50 to about 70 parts by weight of a reinforcing filler, per 100 parts by weight of said grafted rubber copolymer, and at least about 4 parts by weight of a curative selected from the group consisting of sulfur and sulfur donors, per 100 parts by weight of said grafted rubber copolymer, wherein said uncured rubber compound is devoid of peroxide components; and subsequently curing the uncured compound to form the vulcanized rubber compound;

wherein the vulcanized rubber compound has a tan δ of from about 0.03 to 0.18, measured at 100° C., 7% deflection and 10 Hz.

9. A vulcanized rubber compound, as set forth in claim 8, wherein the mechanical static modulus of said vulcanized rubber compound ranges from about 1400 to 4000 psi at 15% strain.

10. A vulcanized rubber compound, as set forth in claim 8, having a Shore A hardness of from about 72 to 97.

11. A vulcanized rubber compound, as set forth in claim 8, wherein said uncured grafted rubber copolymer comprises:

from about 60 to 80 percent by weight of at least one of said polyisoprene and said diene polymer, and from about 20 to 40 percent by weight of said polymeric metal salt of said α, β-ethylenically unsaturated carboxylic acid.

12. A vulcanized rubber compound, as set forth in claim 8, wherein said polymeric metal salt of said α, β-ethylenically unsaturated carboxylic acid is poly zinc dimethacrylate.

13. A vulcanized rubber compound, as set forth in claim 1, wherein said reinforcing filler comprises carbon black.

\* \* \* \* \*